May 8, 1923.                J. W. REASER ET AL                    1,454,788
                            HEADLIGHT MECHANISM
                      Filed March 31, 1922        3 Sheets-Sheet 1
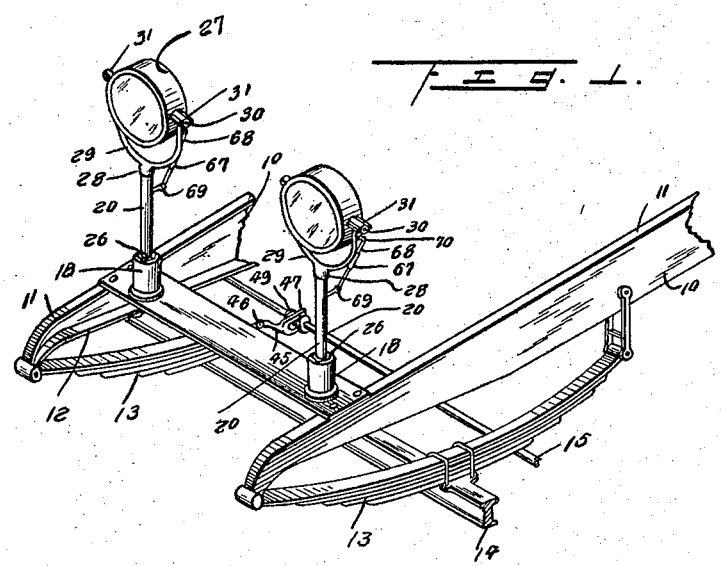
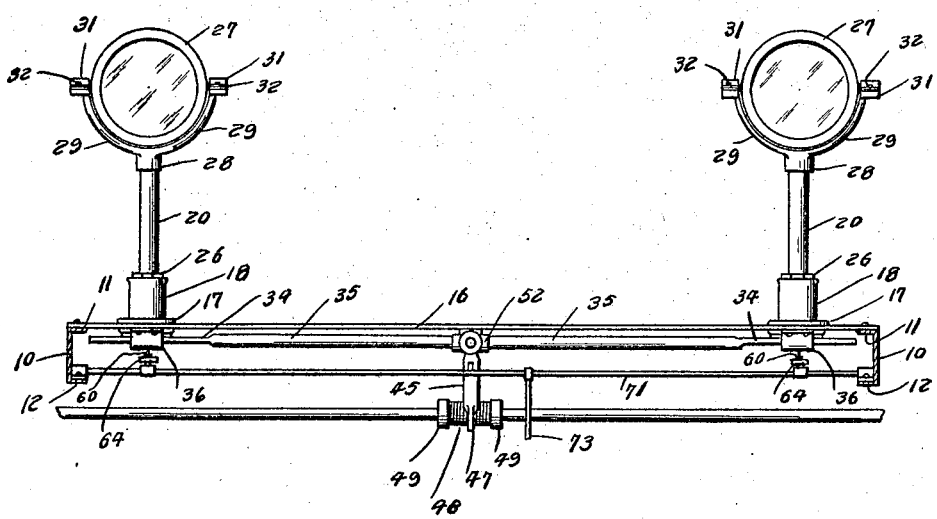
Inventor
J. W. Reaser, S. M. Hull &
F. H. Osborne
By
Attorney May 8, 1923.
J. W. REASER ET AL
HEADLIGHT MECHANISM
Filed March 31, 1922
1,454,788
3 Sheets-Sheet 2
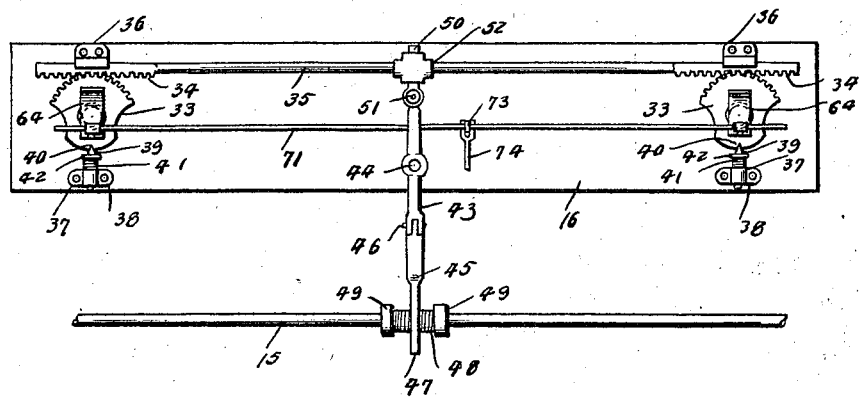
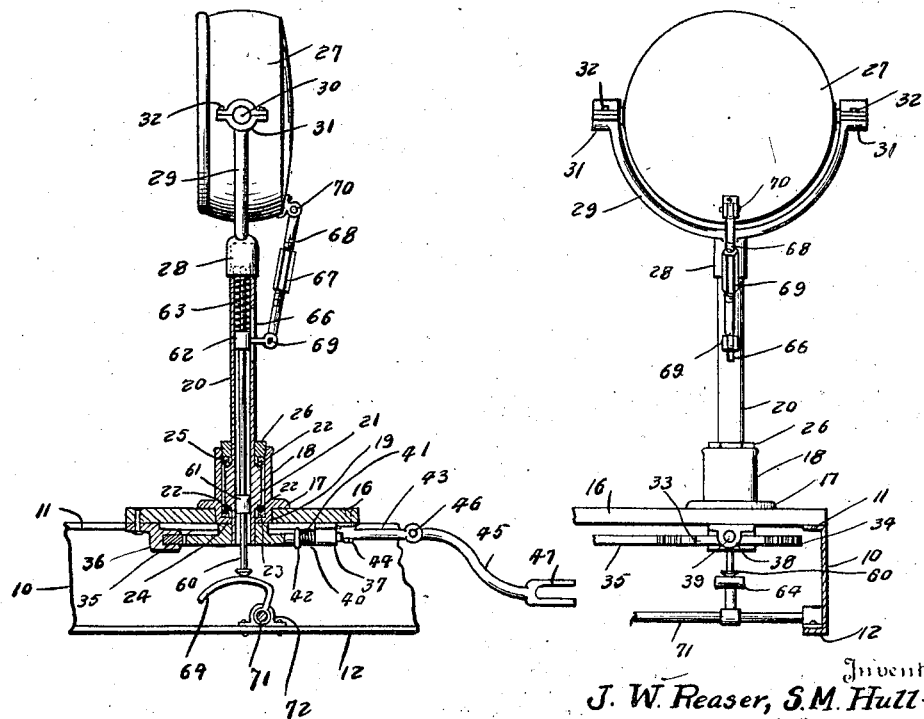
Inventor
J. W. Reaser, S. M. Hull +
F. H. Osborne May 8, 1923.　　　　　　　　　　　　　　　　　　　1,454,788
J. W. REASER ET AL
HEADLIGHT MECHANISM
Filed March 31, 1922　　　3 Sheets-Sheet 3

Inventor
J. W. Reaser, S. M. Hull &
F. H. Osborne.

By　　　　　　　　　　　Attorney

Patented May 8, 1923.

1,454,788

UNITED STATES PATENT OFFICE.

JOHN W. REASER, SAMUEL M. HULL, AND FREDERICK H. OSBORNE, OF PORTSMOUTH, VIRGINIA.

HEADLIGHT MECHANISM.

Application filed March 31, 1922. Serial No. 548,337.

*To all whom it may concern:*

Be it known that we, JOHN W. REASER, SAMUEL M. HULL, and FREDERICK H. OSBORNE, citizens of the United States, residing at Portsmouth, in the county of Norfolk and State of Virginia, have invented certain new and useful Improvements in a Headlight Mechanism; and we do hereby declare the following to be a full, clear, and exact description of the invention, such as will enable others skilled in the art to which it appertains to make and use the same.

This invention relates to a headlight mechanism particularly for automobiles and other vehicles.

One important object is to provide novel means whereby the headlight will give maximum efficiency and safety through dirigibility and capability of movement from a horizontal axis so that the light rays may be projected against the ground as when adjacent to a vehicle moving in a different direction.

Another important object is to provide a construction in which the headlights are dirigible and have means to tilt the same from a horizontal axis operable regardless of the position of the headlight laterally or dirigibly.

Still another object is to provide mounting means for the headlight as standards and means passing therethrough operable to tilt the headlights.

A further object is to provide a construction which may be supported from the side beams of an automobile and as from a base or support which may span said side beams.

It is still further aimed to provide a construction having a connection with the steering mechanism of an automobile in such manner that slight movement of the latter and vertical action of the vehicle on its springs will not affect the position or operation of the headlight.

Additional objects and advantages will become apparent from a consideration of the description following taken in connection with accompanying drawings illustrating one practical embodiment.

In said drawings:—

Figure 1 is a perspective view illustrating the headlight in connection with associated automobile parts;

Figure 2 is a view showing the headlight mechanism in front elevation and as supported from the side beams of an automobile, the latter being shown in section;

Figure 3 is an inverted plan view of the parts of Figure 2;

Figure 4 is a view in vertical section principally, of the mounting and operating means for one of the headlights;

Figure 5 is an enlarged front elevation of the parts of Figure 4;

Like reference characters designate like or similar parts in the different views.

Figure 6:
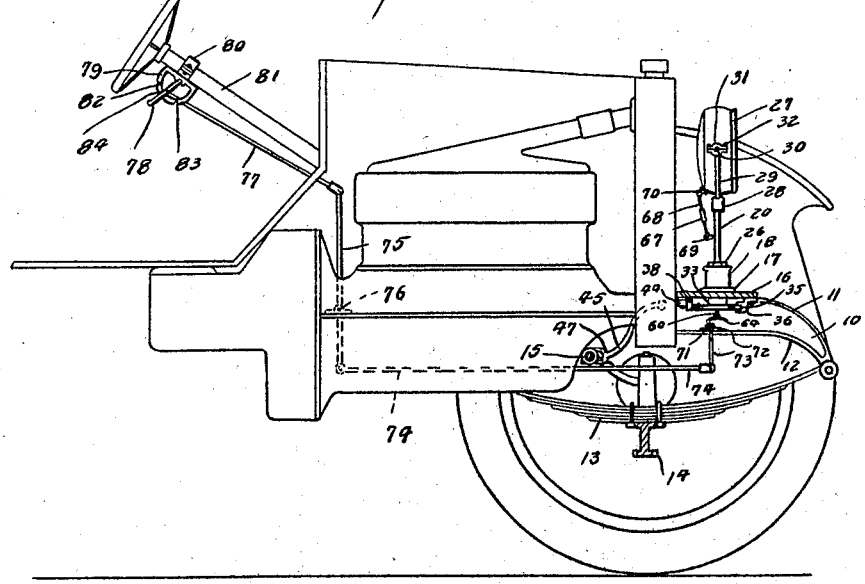
Figure 6 is a view illustrating one form of means operable to tilt the lamp, in connection with associated automobile parts.

Parts of an automobile have been fragmentarily shown in the drawings to facilitate an understanding of our improved headlight mechanism. The usual side beams of the chassis are shown at 10, being as usual, metallic and U-shaped in cross section so as to have the horizontal inwardly extending upper and lower flanges 11 and 12, respectively. Bolster springs for the side beams are shown at 13 as supported on the front axle 14 in the rear of which the usual steering rod 15 is provided, primarily for lateral movement as usual according to the direction of turning of the front or steering wheels of the automobile.

Spanning the side beams 10 and resting on and being secured to the flanges 11 in any suitable manner is a base or supporting plate, preferably metallic, as at 16. Rigidly secured to the support 16, by means of flanges 17, are bearing housings 18, which depend and are disposed in suitable openings 19 in the plates 16. Preferably two of the housings are provided. In each housing, a standard or stanchion 20, consisting principally of a metallic tube, is journaled. The stanchions 20 are laterally enlarged as at 21 where they pass through housings 18 and at opposite ends of the enlarged portions 21, bearing balls or the equivalent anti-friction means as at 22, are provided. Within the housing, bearing rings 23 are provided, supported by inwardly extending flanges 24 of the housing. The lowermost balls 22 rest on the rings 23. An upper bearing ring 25 is disposed in the housing in engagement with the upper balls 22 and the latter is maintained in place by a ring nut 26 screw threaded into the housing.

Lamps or headlights of any suitable construction are shown at 27 and adapted to be secured to and move with the standards 20. To this end, forks or brackets 28 are secured to the standards 20 at their upper ends. The arms of the forks 28 are designated 29 and swiveled thereon are trunnions 30 projecting laterally from the lamp 27. The trunnions are maintained in place by means of detachable clamp plates 31, bolted or otherwise secured to the arms 29 as at 32.

Standards 20 depend below the bearing housings 18 and keyed or otherwise rigidly fastened thereto are gear wheels 33 which may be segmental as shown. In mesh with the teeth of gear wheels 33 are the teeth of racks 34 which may form integral parts of a bar 35 movable transversely of the vehicle and disposed against the under surface of the plate 16. Bar 35 is maintained in place by means of cleats or brackets 36 suitably fastened to the under surface of plate 16.

Dead center blocks for the segments 33 may be provided as at 37 consisting of brackets 38 having latch bolts 39 slidable transversely thereof and urged into notches or recesses 40 of the segments by means of coil springs 41 of the expansive type disposed intermediate the brackets 38 and enlargements or flanges 42 thereon.

The rod 35 is adapted to be moved through operation of the steering mechanism of the automobile and specifically a steering rod at 15. To this end a lever 43 is provided which is pivoted to a stud 44 depending from the plate 16. The forward portion of the lever is designated 45 and pivoted to the remainder at 46 and has a fork at 47 to surround the rod 15. Bearing against the fork 47 at opposite sides thereof are expansive coil springs 48 which also engage abutments 49 on the rods 15. At the rear end, lever 43 may slidably extend, as at a pin 50 pivoted to the remainder at 51, into a bracket 52 on bar 35. The dead center locks 39 and springs 48 serve to maintain the lamps 27 in a normal position and in such manner that the same will not vibrate or be displaced therefrom by slight movement of the steering rod 15. At the same time, vertical movement of the automobile parts supported by the springs 13 is compensated for by the pivoting of section 45 at 46 to the remainder of the lever and the slip connection of the fork 47 with rod 15.

In operation, according to the movement of the steering rod 15 in either lateral direction, lever 43 will be swung on its pivot 44 accordingly shifting bar 35 and swing the lamps 27 laterally or dirigibly due to their connection with standards 2 and the engagement of gear segments 33 with the rack 34. During such movement, the disengagement of the latches 39 from the notches 40 is automatic and against tension of the springs 37 as will be realized. As the movement of the rod 15 occurs through operation of the steering wheel of the vehicle as usual and as clearly understood, the lamp 27 will be turned automatically according to the turn made by the vehicle equipped with them.

Vertically slidable within the standards 20 are lamp tilting members or rods 60. Spacing members 61 and 62 are disposed intermediate the ends 20 and rods 60, being rigid with the latter. Coil springs of the expansive type are housed at 63 within standards 20 and bear against the spacing member 62 in order to urge the rod 60 downwardly. At the lower ends, the rods 60 rest on or contact with cams at 64.

Extending laterally from the spacing member 62 is a stud 65, which passes through a vertically elongated slot 66 in the wall of the standard. A turn buckle 67 is screw threaded to rods 68 pivoted at 69, one to the studs 65 and at 70, one to the lamp 27. Through manipulation of the turn buckle 67, the rod sections 68 may be lengthened or shortened to adjust the position of the lamps 27, as will be understood.

Cams 64 are rigid on a rod 71 and disposed parallel to the bar 35 journaled for movement on a horizontal axis by bearings 72 secured to the flanges 12.

It will be realized that rod 71 is adapted to be turned so that the cams 64, springs 63 will coact for raising and lowering of the rod 60 and consequent tilting of the lamps 27 from a horizontal axis. This tilting is for the purpose of directing the rays from the lamps 27 directly on to the ground when adjacent a vehicle traveling in another direction to prevent the rays of the lamps 27 from annoying the other driver and thus conducing to safety.

Any suitable means may be employed to rock the rod or shaft 71. To this end, a crank 73 may extend from the rod 71 and by means of a link 74 to which it is pivoted, be pivotally connected to a lever 75 fulcrumed at 76 to a suitable bracket mounted on the automobile. A link 77 is pivoted to lever 75 and to a manipulating lever at 78. Lever 78 is pivoted to a bracket 79 clamped as at 80 to the steering post 81 of the automobile. Bracket 79 has a rack 82 provided with notches 83 into which a slidable spring pressed plunger 84 carried by lever 78 may be selectively disposed, in order to lock the lever 78 in any of its adjusted positions and accordingly lock the lamps 27 in any of their adjusted positions.

Figure 7:
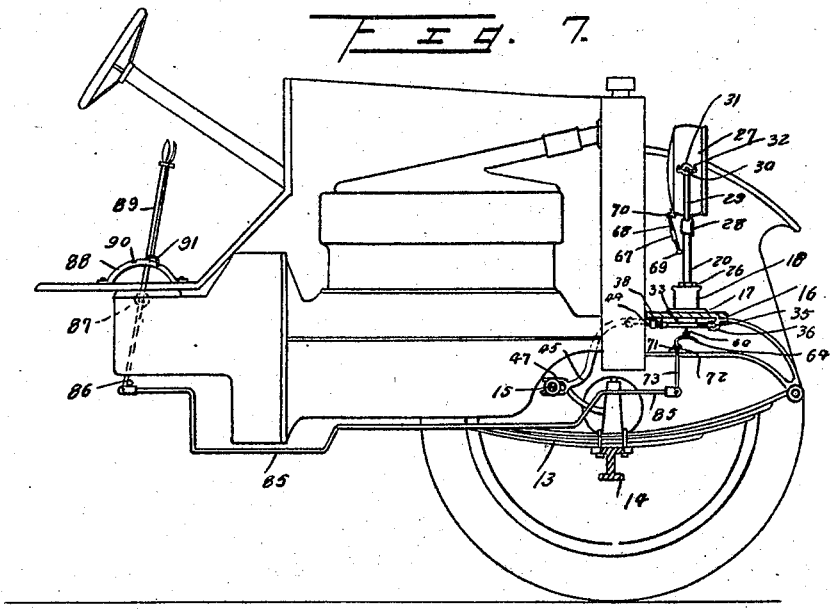
Figure 7 is a view similar to Figure 6 but showing a modified form of lamp-tilting means.

As a modified form of means for rocking the said rod 71, and as shown in Figure 7, a tortuous link 85 is pivoted to said crank 73 and also pivoted to an operating lever 86. Lever 86 is fulcrumed at 87 and is movable relatively to a rack 88 secured to or adjacent the floor of the automobile at 89. Rack 88 is provided with a plurality of notches at 90 to be selectively entered by a plunger device 91 on the lever 86. Through selective engagement of the plunger 91 in the notches 90, the shaft or rod 71 may be locked in adjusted positions, thus locking or maintaining the lamps 27 in adjusted or tilted position.

Attention is called to the fact that a positive connection is avoided between rods 60 and cams 64 so that the former may turn on the cams as the lamps move dirigibly, and may be operated to tilt the lamps regardless of their dirigible or laterally adjusted positions.

As merely examples of the practice of the invention have been illustrated and described, it is to be understood that changes in the details, combinations, arrangements and functions of the parts may be resorted to provided they fall within the spirit and scope of the invention.

We claim as our invention:—

1. A headlight mechanism including a lamp, a hollow standard on which the lamp is pivoted, a rod slidable in the standard, means operable to slide the rod, a spring to urge the rod into engagement with said means, the standard having a slot therethrough, and means having connection with the rod to said slot operable through sliding movement of the rod to tilt said lamp.

2. A headlight mechanism including a lamp, a hollow standard therefor, a rod slidably mounted in the standard, a cam on which said rod rests and may turn, means operable to move the cam, a spring in the standard to urge the rod into engagement with the cam, said standard having an elongated slot, a stud extending from the rod through said slot, and an operative connection between said stud and said lamp to tilt the latter through movement of the rod.

3. A headlight mechanism including a lamp, a plate disposed on the side beams of a vehicle frame, a standard extending from the latter, a housing from the place in which said standard is journaled, a bar supported on and adjacent the lower surface of the base, a driving connection between said bar and said standard, means to drive the bar through movement of the steering mechanism of a vehicle, means operable to tilt the lamp including a rod extending below said standard, a rod journaled on the lower flanges of said side beams, a cam on said rod engageable with said first mentioned rod, and means operable to rock the last mentioned rod.

In testimony whereof we affix our signatures in presence of two witnesses.

JNO. W. REASER.
SAMUEL M. HULL.
FREDERICK H. OSBORNE.

Witnesses:
JETHRO I. GREEN,
HERBERT LEE WILSON.